US012326134B1

(12) United States Patent
Fripp et al.

(10) Patent No.: US 12,326,134 B1

(45) Date of Patent: Jun. 10, 2025

(54) FLEXIBLE TURBINE FOR POWER GENERATION IN STRAIGHT PIPE

(71) Applicant: Halliburton Energy Services, Inc., Houston, TX (US)

(72) Inventors: Michael Linley Fripp, Singapore (SG); Stephen Michael Greci, Carrollton, TX (US); Kanishk Parmar, Singapore (SG)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 18/531,311

(22) Filed: Dec. 6, 2023

(51) Int. Cl.

*F03B 3/12* (2006.01)
*F03B 13/02* (2006.01)
*F03B 17/06* (2006.01)

(52) U.S. Cl.

CPC .............. *F03B 3/121* (2013.01); *F03B 13/02* (2013.01); *F03B 17/06* (2013.01); *F05B 2220/30* (2013.01); *F05B 2220/706* (2013.01); *F05B 2280/5001* (2013.01)

(58) Field of Classification Search

CPC .. F03B 3/12; F03B 3/121; F03B 3/125; F03B 3/126; F03B 13/02; F03B 17/06; E21B 41/0085; F05B 2220/30; F05B 2220/706; F05B 2280/5001

See application file for complete search history.

(56) References Cited

U.S. PATENT DOCUMENTS

| | | | |
|---|---|---|---|
| 5,839,508 A | 11/1998 | Tubel et al. | |
| 6,763,899 B1 | 7/2004 | Ossia et al. | |
| 7,246,660 B2 | 7/2007 | Fripp et al. | |
| 10,619,435 B2 | 4/2020 | Greci et al. | |
| 2012/0319409 A1* | 12/2012 | Schoonover ............ | F03B 13/02 290/1 R |

(Continued)

FOREIGN PATENT DOCUMENTS

CN 102882335 A * 1/2013

OTHER PUBLICATIONS

CN102882335A_Machine Translation (Huang, Y.) Jan. 16, 2013. [retrieved on Nov. 25, 2024] Retrieved from: Espacenet. (Year: 2013).*

(Continued)

*Primary Examiner* — Elton K Wong

(74) *Attorney, Agent, or Firm* — Scott Richardson; C. Tumey Law Group PLLC

(57) ABSTRACT

A downhole power generation system may include a downhole tubular having a generator recess. The generator recess is radially offset from a central bore of the downhole tubular, and the generator recess is connected to the central bore via an opening. The system may further include a generator disposed at least partially within the generator recess. Additionally, the system may include at least one turbine blade configured to drive rotation of the rotor in response to fluid flow through the central bore with the at least one turbine blade in an extended position. The at least one turbine blade is disposed at least partially within the central bore in the extended position, and the at least one turbine blade is configured to move at least partially into the generator recess toward a retracted position in response to contact with a downhole tool moving along the central bore.

17 Claims, 8 Drawing Sheets

(56) References Cited

U.S. PATENT DOCUMENTS

| | | | | |
|---|---|---|---|---|
| 2013/0062881 | A1 | 3/2013 | Mellah | |
| 2016/0076508 | A1 * | 3/2016 | Bornard | F03B 3/121<br>416/131 |
| 2017/0306725 | A1 | 10/2017 | Hunter | |
| 2022/0034197 | A1 | 2/2022 | Altammar | |

OTHER PUBLICATIONS

International Search Report and Written Opinion for International Patent Application No. PCT/US2024/039388 dated Nov. 7, 2024. PDF file. 9 pages.

* cited by examiner

FLEXIBLE TURBINE FOR POWER GENERATION IN STRAIGHT PIPE

BACKGROUND

After drilling a wellbore in a subterranean formation for recovering hydrocarbons such as oil and gas lying beneath the surface, a casing string may be fed into the wellbore. Generally, the casing string protects the wellbore from failure (e.g., collapse, erosion) and provides a fluid path for hydrocarbons during production. Further, cement may be pumped into the annular space between the casing and the wellbore to form a seal. To access the hydrocarbons for production, a perforating gun system may be deployed into the casing string to form perforations in the casing and/or cement such that hydrocarbons may flow into the casing string via the perforation. Further, a completion assembly having various downhole features may be deployed to separate production zones and control flow of the hydrocarbons (e.g., production fluid). Generally, completion assemblies may include various electronic features (e.g., sensors, telemetry repeaters, inflow control valves, etc.), which need power to operate.

Downhole turbines may be used to power the various electronic features via hydraulic power generation, which may include capturing power from the flow of production fluid through the piping (e.g., the casing, tubing, etc.). However, having a downhole turbine disposed in the piping for power generation may block other downhole tools from passing through the piping at the location of the downhole turbine. As such, downhole turbines generally must be pulled out-of-hole before another tool (e.g., ball of setting tool, logging tool, wash pipe, etc.) may be run-in-hole past the location of the downhole turbine. Then, to continue power generation for the various electronic features, the downhole turbine may be run back in-hole after the other downhole tool is installed. However, removing and re-deploying the downhole turbine may be expensive and time consuming.

BRIEF DESCRIPTION OF THE DRAWINGS

These drawings illustrate certain aspects of some of the embodiments of the present disclosure and should not be used to limit or define the method.

Figure 7B:
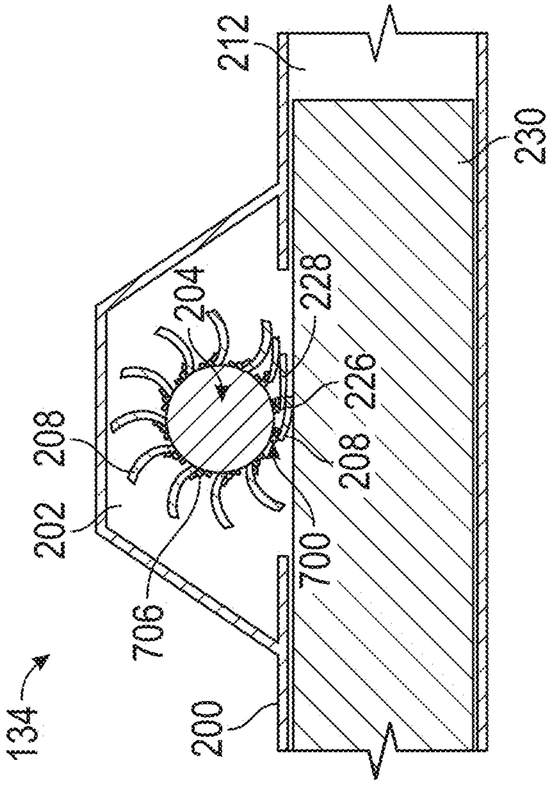
Figure 7A:
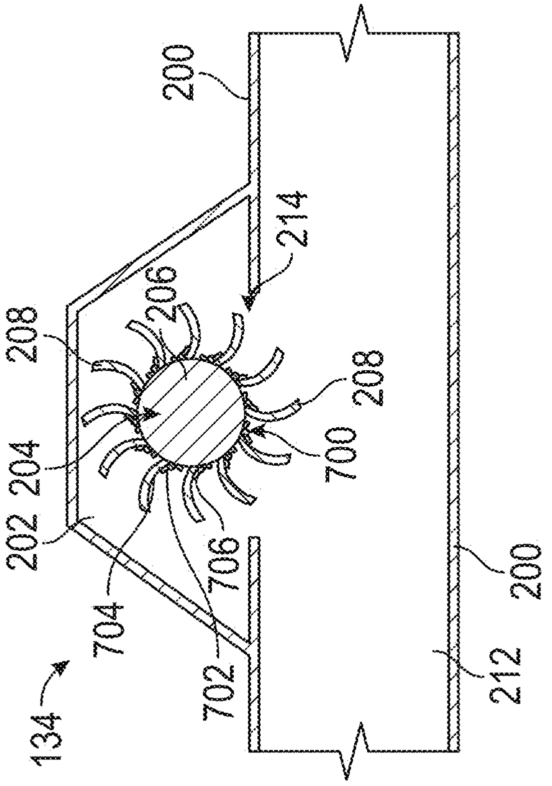

FIGS. 7A-B illustrate respective cross-sectional views of a downhole power generation system having hinged turbine blades, in accordance with some embodiments of the present disclosure.

Figure 8B:
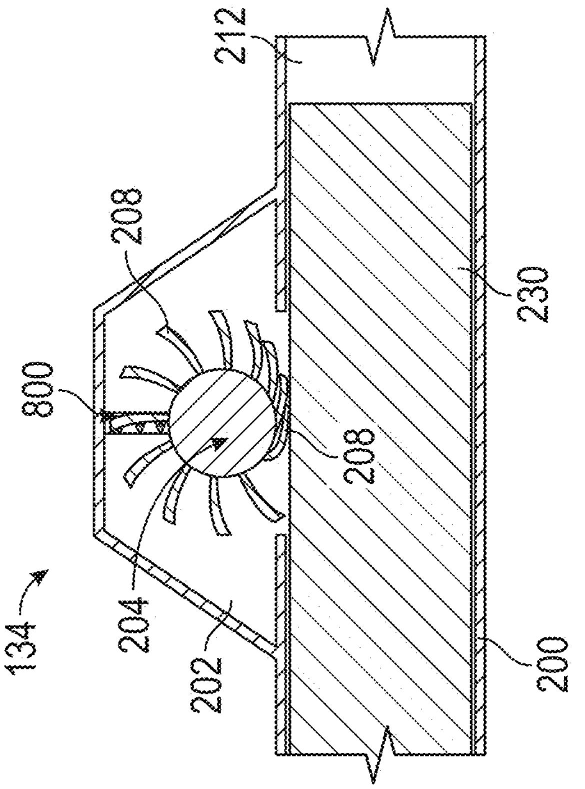
Figure 8A:
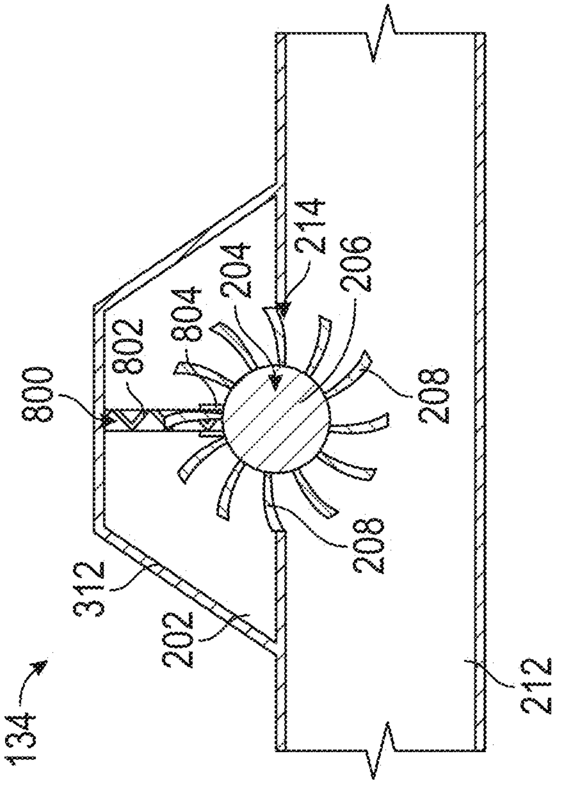

FIGS. 8A-B illustrate respective cross-sectional views of a downhole power generation system having a spring-biased generator, in accordance with some embodiments of the present disclosure.

DETAILED DESCRIPTION

Disclosed herein are systems and methods for generating power downhole and, more particularly, example embodiments may include a downhole power generation system having at least one turbine blade and/or generator configured to move between a power generating position (e.g., extended position) and a retracted position to permit other downhole tools to pass by the downhole power generation system while the downhole power generation system is deployed downhole. As set forth in greater detail below, the at least one turbine blade may be deployed in a central bore of a downhole tubular in the power generating position such that the at least one turbine may drive rotation of a rotor of the generator in response to flow of production fluid through the central bore. However, in response to another downhole tool contacting the at least one turbine blade, the at least one turbine blade may at least partially move out of the central bore toward the retracted position to allow the other downhole tool to pass by the at least one turbine blade. As such, the present downhole power generating system may eliminate the need to remove and redeploy the at least one turbine blade when deploying other downhole tools, which may save time and expense.

Figure 1:
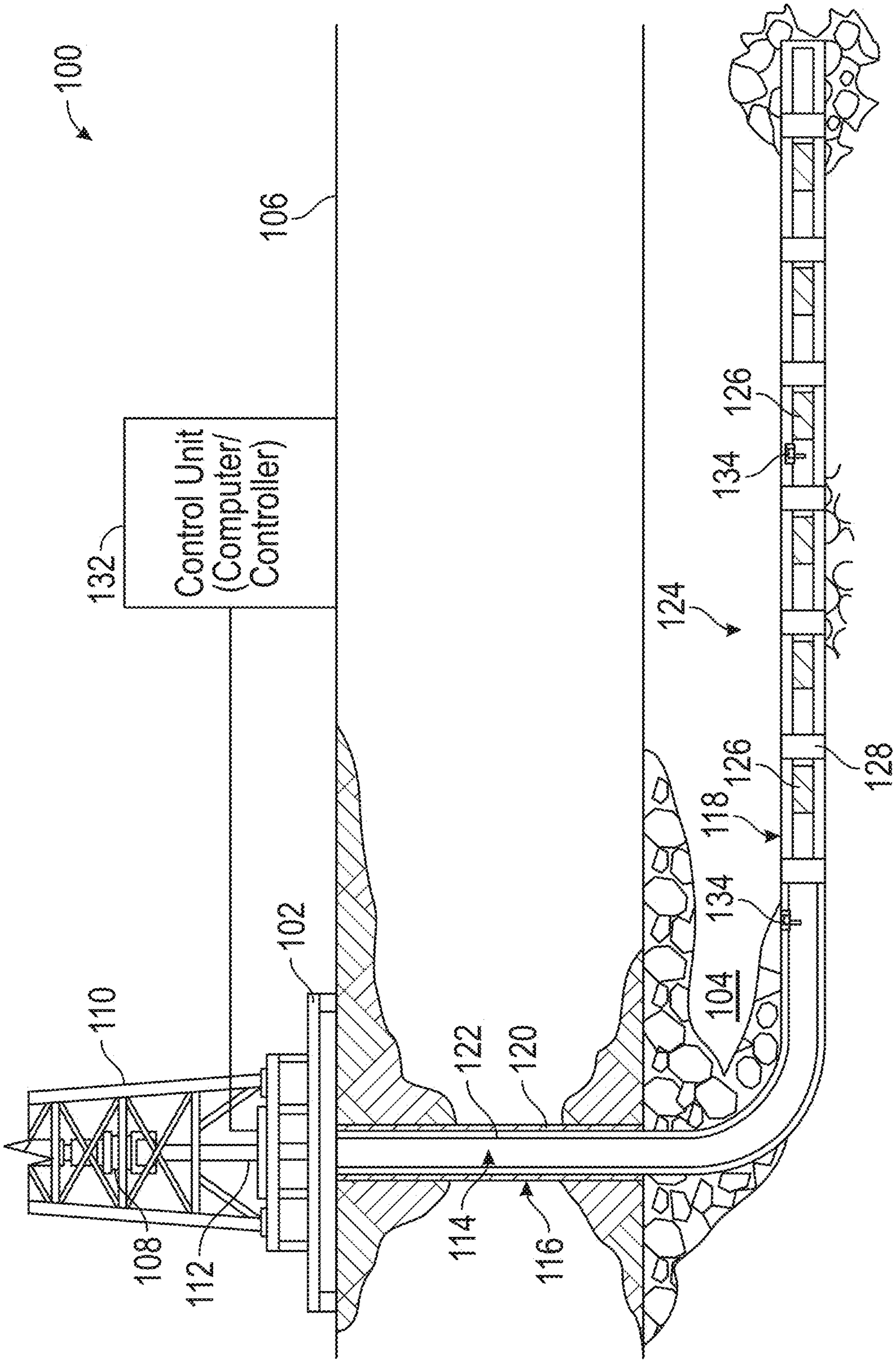
FIG. 1 illustrates an elevation view of a well system, in accordance with some embodiments of the present disclosure.

FIG. 1. illustrates an elevation view of a well system, in accordance with some embodiments of the present disclosure. The well system 100 includes a platform 102 positioned over a subterranean formation 104 located below the earth's surface 106. The platform 102 may include a hoisting apparatus 108 and a derrick 110 for raising and lowering a downhole conveyance 112, such as a drill string, casing string, tubing string, coiled tubing, a running tool, etc. As illustrated, the well system 100 includes a wellbore 114 that extends through various earth strata and has a substantially vertical section 116 that transitions into a substantially horizontal section 118. A portion of the vertical section 116 may have casing 108 cemented therein, and the horizontal section 118 may extend through the hydrocarbon bearing subterranean formation 104. In some embodiments, the horizontal section 118 may be uncompleted and otherwise characterized as an "open hole" section of the wellbore 114. In other embodiments, however, the casing 108 may extend into the horizontal section 118.

Further, production tubing 122 may be positioned within the wellbore 114 and extend from the surface 106. The production tubing 122 provides a conduit for fluids extracted from the formation 104 to travel to the surface 106 for production. A completion assembly 124 may be coupled to or otherwise form part of the lower end of the production tubing 122 and arranged within the horizontal section 118. The completion assembly 124 divides the wellbore 114 into various production intervals adjacent the subterranean formation 104. To accomplish this, as depicted, the completion assembly 124 may include a plurality of flow control devices 126 axially offset from each other along portions of the production tubing 122. Each flow control device 126 may be positioned between a pair of wellbore packers 128 that provides a fluid seal between the completion assembly 124 and the inner wall of the wellbore 114, and thereby defining discrete production intervals. The flow control devices 126 may be used to convey or otherwise regulate the flow of fluids (i.e., a production fluid stream) into the completion assembly 124 and, therefore, into the production tubing 122.

In operation, each flow control device 126 filters particulate matter out of the fluids originating from the formation 104 such that particulates and other fines are not produced to the surface. Further, each flow control device 126 regulates the flow of the fluids into the completion assembly 124. Regulating the flow of fluids in each production interval may be advantageous in preventing water coning or gas coning in the subterranean formation 104. Other uses for flow regulation of the fluids include, but are not limited to, balancing production from multiple production intervals, minimizing production of undesired fluids, maximizing production of desired fluids, etc.

In the illustrated embodiment, each flow control device 126 includes one or more sand screens that serve as a filter medium to filter the incoming fluids. The sand screens, however, may be replaced with any other type of filter medium, such as a slotted liner or the like, without departing from the scope of the disclosure. In yet other embodiments, the filter medium may be omitted from one or more of the flow control devices 126 and the incoming fluids may instead be conveyed directly without filtration. Accordingly, use of the sand screens in FIG. 1 is for illustrative purposes only and should not be considered limiting to the present disclosure.

It should be noted that even though FIG. 1 depicts the flow control devices 126 as being arranged in an open hole portion of the wellbore 114, embodiments are contemplated herein where one or more of the flow control devices 126 is arranged within cased portions of the well bore 102. Also, even though FIG. 1 depicts a single flow control device 126 arranged in each production interval, any number of flow control devices 126 may be deployed within a particular production interval without departing from the scope of the disclosure. In addition, even though FIG. 1 depicts multiple production intervals separated by the packers 128, any number of production intervals with a corresponding number of packers 128 may be used. In other embodiments, the packers 128 may be entirely omitted from the completion interval, without departing from the scope of the disclosure.

Furthermore, while FIG. 1 depicts the flow control devices 126 as being arranged in the horizontal section 118 of the wellbore 114, the flow control devices 126 are equally well suited for use in the vertical section 116 or portions of the well bore 114 that are deviated, slanted, multilateral, or any combination thereof. The well system 100 may additionally include a surface control unit 132. The surface control unit 132 may be configured to output signals to control one or more downhole devices. Additionally, the surface control unit 132 may be configured to receive signals from the one or more downhole devices.

Further, the well system may include one or more downhole power generation systems 134 disposed within the wellbore 114. As illustrated, the downhole power generation systems 134 may be disposed along the completion assembly 124. Additionally, the downhole power generation systems 134 may be disposed uphole from the completion assembly 124. Indeed, the downhole power generation systems 134 may be disposed in any suitable portion of the wellbore 114 for providing power for at least one downhole tool. For example, the completion assembly 124 may include a sensor, or any suitable device, configured to operate via power supplied by the downhole power generation system 134.

Moreover, although a land-based oil and gas platform 102 is illustrated in FIG. 1, the scope of this disclosure is not thereby limited, and thus could potentially apply to offshore applications. The use of directional terms such as above, below, upper, lower, upward, downward, left, right, uphole, downhole and the like are used in relation to the illustrative embodiments as they are depicted in the figures, the upward direction being toward the top of the corresponding figure and the downward direction being toward the bottom of the corresponding figure, the uphole direction being toward the surface 106 of the wellbore 114 and the downhole direction being toward the toe of the wellbore 114.

Figure 2B:
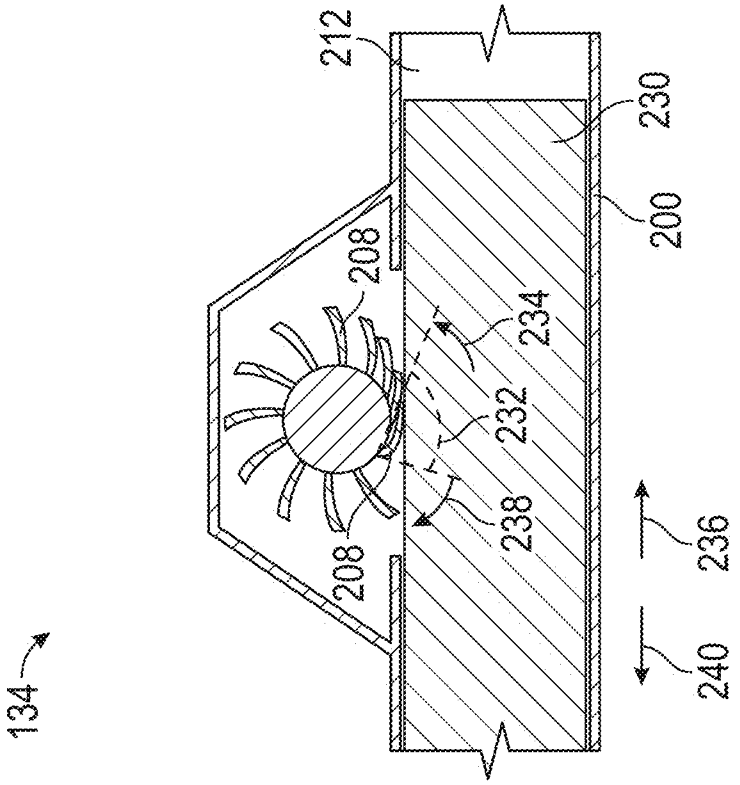
FIGS. 2A-B illustrate respective cross-sectional views of a downhole power generation system having cross-flow turbine blades in a power generating position and a retracted position, in accordance with some embodiments of the present disclosure.
Figure 2A:
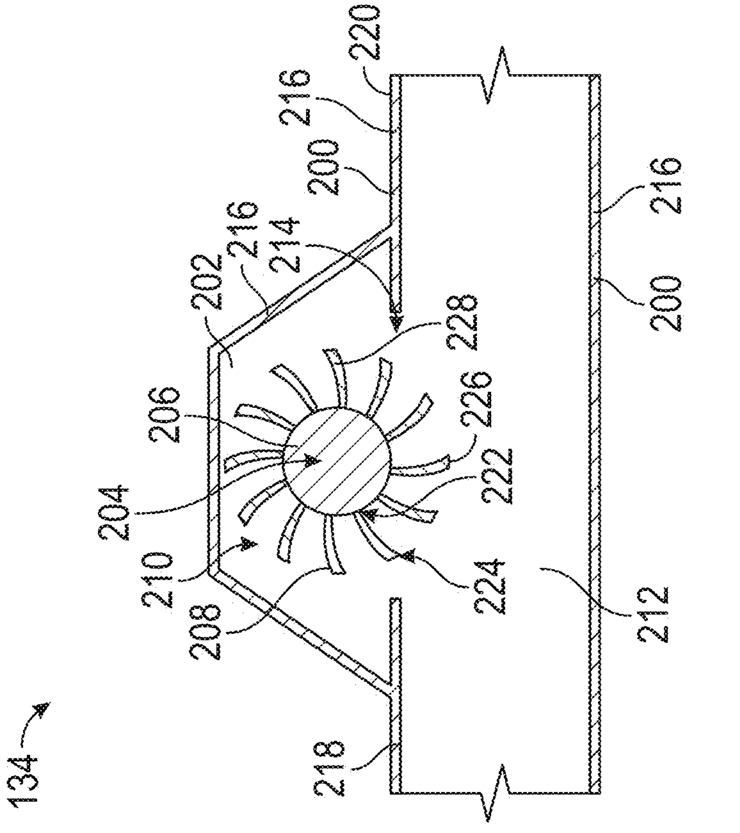

FIGS. 2A-B illustrate respective cross-sectional views of a downhole power generation system having at least one cross-flow turbine blade in a power generating position and a retracted position, in accordance with some embodiments of the present disclosure. In particular, FIG. 2A illustrates a downhole tubular 200 (e.g., the casing 120, the production tubing 122, etc.) of the downhole power generation system 134. As illustrated, the downhole tubular 200 includes a generator recess 202. A generator 204 of the downhole power generation system 134 may be disposed at least partially within the generator recess 202. In particular, the generator 204 may include a rotor 206 and a stator (shown in FIG. 3A) that may be disposed at least partially within the generator recess 202. Further, at least one turbine blade 208 of the downhole power generation system 134 may be secured to the rotor 206 and may extend into a central bore 212 of a downhole tubular 200 in the power generating position. Indeed, as illustrated, the at least one turbine blade 208 may include a plurality of turbine blades 210 secured to the rotor 206 such that at least one turbine blade 208 of the plurality of turbine blades 210 may always be angularly positioned to be at least partially disposed within the central bore 212 as the rotor 206 rotates. As such, the fluid flow through the central bore 212 may exert a force on the at least one turbine blade 208 of the plurality of turbine blades 210 currently extended into the central bore 212 in the power generating position, which may drive rotation of the rotor 206. Such rotation of the rotor 206 with respect to the stator may cause the generator 204 to generate power for the downhole power generation system 134.

Moreover, the generator recess 202 may be radially offset from a central bore 212 of the downhole tubular 200. In particular, the generator recess 202 may be adjacent the central bore 212 in a position radially offset from the central bore 212 such that the generator recess 202 may be connected to the central bore 212 via an opening 214 formed between the central bore 212 and the generator recess 202. The at least one turbine blade 208 and/or or the generator 204 may extend at least partially into the central bore 212 from the generator recess 202 via the opening 214. As illustrated, the generator recess 202 may be formed via a sidewall 216 of the downhole tubular 200 having a variable diameter about a portion of the axial length and circumference of the downhole tubular 200 that is configured to form the generator recess 202. Indeed, the downhole tubular 200 may be manufactured or shaped to have the generator recess 202 formed in an inner surface 218 of the downhole tubular 200.

Alternatively, the generator recess 202 may be formed via a hollow housing (shown in FIG. 3A) secured to an outer surface 220 of the downhole tubular 200. In particular, at least one hole may be bored through the sidewall 216 of the downhole tubular 200 to form the opening 214. The hollow housing may be welded, fastened, or otherwise secured to the outer surface 220 of the downhole tubular 200 over the opening 214. A cavity in the hollow housing may define the generator recess 202, which is accessible via the opening 214. Further, the hollow housing may be sealed against the outer surface 220 of the downhole tubular 200 to retain production fluid passing through the central bore 212 and into the generator recess 202 via the opening 214.

As set forth above, the generator 204 includes the rotor 206 and the stator that may be disposed within the generator recess 202. As illustrated, the rotor 206 and the stator may be disposed entirely in the generator recess 202. However, as set forth in greater detail below, the rotor 206 and/or the stator may alternatively be disposed at least partially within the central bore 212 (shown in FIG. 8A) to further engage the at least one turbine blade 208 with the flow of production fluid in the central bore 212. That is, having the rotor 206 disposed at least partially within the central bore 212 may position the entire at least one turbine blade 208, from a proximal blade end 222 to a distal blade end 224, within the central bore 212 in the power generating position, which may increase the effectiveness of the at least one turbine blade 208 in driving rotation of the rotor 206. As such, the at least one turbine blade 208 may include a shorter blade length when positioned entirely within the central bore 212 than when positioned only partially within the central bore 212.

Moreover, as illustrated, the generator 204 may include an axial flux asynchronous induction generator. However, the generator 204 may include any suitable type of generator 204. For example, the generator 204 may include a synchronous generator, an asynchronous generator, an axial flux generator, a radial flux generator, or some combination thereof.

Further, as set fort above, the at least one turbine blade 208 may include a plurality of turbine blades 210 secured to the rotor 206 such that at least one turbine blade 208 of the plurality of turbine blades 210 may always be angularly positioned to be at least partially disposed within the central bore 212 as the rotor 206 rotates. For example, as illustrated, a first blade 226 of the plurality of turbine blades 210 may be disposed at least partially within the central bore 212 in the power generating position. In the power generating position, the first blade 226 may extend radially outward from the rotor 206 and may be straight (e.g., unbent, unrotated, extended, etc.) such that the first blade 226 may be fully extended to engage the fluid flow passing through the central bore 212. The fluid flow passing through the central bore 212 may exert a force on the first blade 226 which may drive rotation of the rotor 206. Such rotation of the rotor 206 with respect to the stator may cause the generator 204 to generate power for the downhole power generation system 134. Further, such rotation may rotate the first blade 226 into the generator recess 202 and rotate a second blade 228 into the central bore 212. Similarly, with the second blade 228 disposed within the central bore 212 in the power generating position, the fluid flowing through the central bore 212 may exert a force on the second blade 228 to continue to drive rotation of the rotor 206.

Moreover, as illustrated, the at least one turbine blade 208 may comprise a cross-flow turbine blade. Alternatively, as set forth below, the at least one turbine blade 208 may include an axial flow turbine blade. Indeed, the at least one turbine blade 208 may include any suitable type of blade for driving rotation of the rotor 206 in response to fluid flow through the central bore 212. Additionally, the at least one turbine blade 208 may include any suitable shape. For example, the at least one turbine blade 208 may be flat, curved, twisted, rounded, tapered, or some combination thereof.

Further, as set forth in greater detail below, the at least one turbine blade 208 may be configured to bend, hinge, or otherwise move from the power generating position (e.g., the extended position) toward a retracted position. As illustrated, the at least one turbine blade 208 may include a flexible material such that the at least one turbine blade 208 may bend from the power generating position toward the retracted position. In particular, the at least one turbine blade 208 may include a material configured to elastically deform (e.g., bend), in response to contact with a secondary downhole tool (shown in FIG. 2B) passing through the central bore 212, to move from the power generating position (e.g., extended position) toward a retracted position. For example, the at least one turbine blade 208 may include flexible materials such as rubber, plastic, metal, composite (e.g., fiber composite), or some combination thereof. Further, the flexible material may include any material having an elastic modulus between one Kilopascal (KPa) and two hundred Gigapascals (GPa). However, the at least one turbine blade 208 may include any suitable material.

FIG. 2B illustrates the downhole power generation system 134 with the at least one turbine blade 208 disposed in a retracted position. As illustrated, the secondary downhole tool 230 (e.g., ball of setting tool, logging tool, wash pipe, etc.) may pass through the central bore 212 of the downhole tubular 200. In the power generating position, the at least one turbine blade 208 may impede movement of the secondary downhole tool 230 through the central bore 212. However, as set forth above, the at least one turbine blade 208 may include a flexible material configured to elastically deform (e.g., bend) in response to contact with the secondary downhole tool 230 to move from the power generating position (e.g., extended position) toward the retracted position. As illustrated, in the retracted position, the at least one turbine blade 208 may move sufficiently out of the central bore 212 such that the secondary downhole tool 230 may pass by the at least one turbine blade 208.

The at least one turbine blade 208 may be configured to bend at an angle 232 between five degrees and one-hundred degrees in response to contact with the secondary downhole tool 230. Alternatively, the at least one turbine blade 208 may be configured to bend at an angle 232 between fifteen degrees and ninety degrees. However, the at least one turbine blade 208 may be configured to bend any suitable angle 232 to move the at least one turbine blade 208 at least partially out of the central bore 212 such that the secondary downhole tool 230 may pass by the downhole power generation system as it moves along the downhole tubular 200.

Further, the at least one turbine blade 208 may be configured to bend in a first direction 234 in response to contacting the secondary downhole tool 230 moving in a downhole direction 236, and the at least one turbine blade may be configured to bend in a second direction 238 in response to contacting the secondary downhole tool 230 moving in an uphole direction 240. For example, a logging tool (e.g., the secondary logging tool) may be run-in-hole to a position downhole from the downhole power generation system 134. As the logging tool engages the at least one turbine blade 208 while being run-in-hole, the at least one turbine blade 208 may bend in the first direction 234. However, as the logging tool is pulled out-of-hole toward the surface 106 (shown in FIG. 1), the at least one turbine blade

208 may be configured to bend in the second direction 238 to permit the logging tool to pass by the downhole power generation system 134.

Figure 3B:
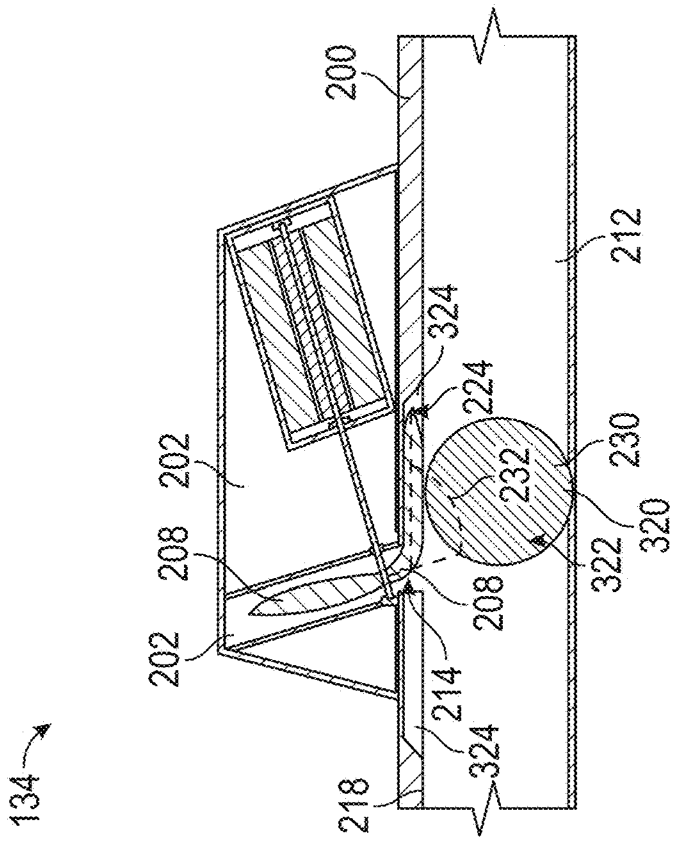
FIGS. 3A-B illustrate respective cross-sectional views of a downhole power generation system having axial-flow turbine blades, in accordance with some embodiments of the present disclosure.
Figure 3A:
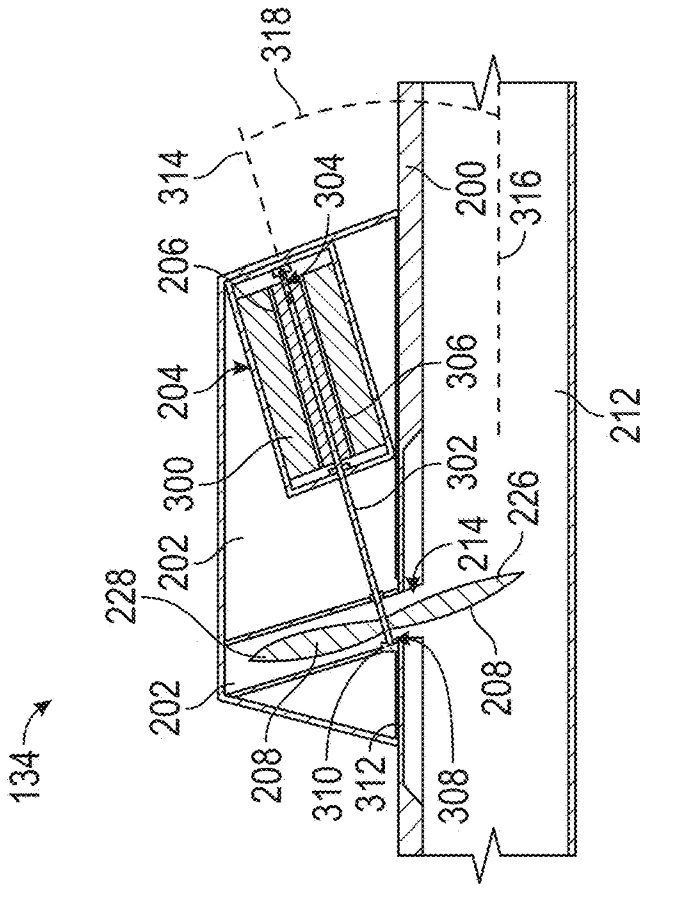

FIGS. 3A-B illustrate respective cross-sectional views of a downhole power generation system having axial-flow turbine blades, in accordance with some embodiments of the present disclosure. In particular, FIG. 3A illustrates the downhole power generation system 134 with the at least one turbine blade 208 comprising an axial-flow turbine blade in the power generating position. As set forth above, the downhole power generation system 134 includes the generator recess 202 connected to the central bore 212 via an opening 214, as well as a generator 204 disposed at least partially within the generator recess 202. As illustrated, the generator 204 (e.g., the stator 300 and the rotor 206) may include a radial flux generator disposed entirely within the generator recess 202. However, the generator 204 may include any suitable type of generator 204.

The downhole power generation system 134 may include a shaft 302 configured to couple the at least one turbine blade 208 with the generator 204. In particular, a first end portion 304 of the shaft 302 may be secured to the rotor 206. As illustrated, the first end portion 304 of the shaft 302 may extend into the generator 204. The rotor 206 may be secured to a radially outer surface 306 of the first end portion 304 of the shaft 302 such that rotation of the shaft 302 drives rotation of the rotor 206. Further, a second end portion 308 of the shaft 302 may be supported by at least one support bearing 310. As illustrated, the at least one support bearing 310 may be mounted to an interior surface 312 of the generator recess 202. Alternatively, the at least one support bearing 310 may be mounted to any suitable surface of the downhole tubular 200. The at least one support bearing 310 may be configured to restrain lateral and axial movement of the shaft 302 while permitting rotation of the shaft 302. Additionally, the at least one turbine blade 208 may be secured to the shaft 302 proximate the second end portion 308 of the shaft 302. However, the at least one turbine blade 208 may be secured to any portion of the shaft 302 between the rotor 206 and the at least one support bearing 310.

Moreover, the generator 204 may be disposed within the generator recess 202 at angle. That is, the generator 204 may be oriented within the generator recess 202 such that a central generator axis 314 of the generator 204 is angularly offset from a central tubular axis 316 of the downhole tubular 200 by an angle 318 between five degrees and forty-five degrees. Accordingly, the shaft 302 (e.g., an angularly oriented shaft) may extend from the generator 204 to the at least one support bearing 310 at an angle such that the shaft 302 is similarly angularly offset from a central tubular axis 316 of the downhole tubular 200 by an angle between five degrees and forty-five degrees. With the shaft 302 disposed at an angle, the at least one support bearing 310 may be mounted to the interior surface 312 of the generator recess 202 in a position proximate the opening 214 such that the at least one turbine blade 208 may be secured to a portion of the shaft 302 disposed proximate the opening 214. Having the at least one turbine blade 208 secured to the portion of the shaft 302 (e.g., the angularly oriented shaft) disposed proximate the opening 214 may extend the at least one turbine blade 208 further into the central bore 212 than an axially oriented shaft that is radially centered in the generator recess 202. Further, having the shaft 302 oriented at an angle may permit the at least one turbine blade angularly oriented to have a longer length than an axially oriented shaft, which may increase the effectiveness of the at least one turbine blade 208. That is, having the shaft 302 oriented at an angle may increase a distance between a radially outer interior surface 312 of the generator recess 202 and the shaft with respect to an axially oriented shaft such the at least one turbine blade 208 may be longer without contacting the radially outer interior surface 312 of the generator recess 202.

Moreover, as set forth above, the at least one turbine blade 208 may include a plurality of turbine blades 210 secured to the rotor 206 such that at least one turbine blade 208 of the plurality of turbine blades 210 may always be angularly positioned to be at least partially disposed within the central bore 212 as the rotor 206 rotates. For example, as illustrated, the first blade 226 of the plurality of turbine blades 210 may be disposed at least partially within the central bore 212 in the power generating position. In the power generating position, the first blade 226 may extend radially outward from the rotor and may be straight (e.g., unbent, unrotated, extended, etc.) such that the first blade 226 may be fully extended to engage the fluid flow passing through the central bore 212. The fluid flow passing through the central bore 212 may exert a force on the first blade 226 which may drive rotation of the rotor 206. Such rotation of the rotor 206 with respect to the stator 300 may cause the generator 204 to generate power for the downhole power generation system 134. Further, such rotation may rotate the first blade 226 into the generator recess 202 and rotate the second blade 228 into the central bore 212. Similarly, with the second blade 228 disposed within the central bore 212 in the power generating position, the fluid flowing through the central bore 212 may exert a force on the second blade 228 to continue to drive rotation of the rotor 206.

Further, the at least one turbine blade 208 may be configured to bend, hinge, or otherwise move from the power generating position (e.g., the extended position) toward the retracted position. Indeed, the at least one turbine blade 208 may include the flexible material such that the at least one turbine blade 208 may elastically deform (e.g., bend), in response to contact with the secondary downhole tool 230 (shown in FIG. 3B) passing through the central bore 212, to move the at least one turbine blade 208 from the power generating position (e.g., extended position) toward a retracted position.

FIG. 3B illustrates the downhole power generation system 134 with the at least one axial-flow turbine blade in the retracted position. As set forth above, the secondary downhole tool 230 (e.g., ball of setting tool, logging tool, wash pipe, etc.) may pass through the central bore 212 of the downhole tubular 200. In the power generating position, the at least one turbine blade 208 may impede movement of the secondary downhole tool 230 through the central bore 212. However, as illustrated, the at least one turbine blade 208 may include a flexible material configured to elastically deform (e.g., bend) in response to contact with the secondary downhole tool 230 to move from the power generating position (e.g., extended position) toward the retracted position. As set forth above, the at least one turbine blade 208 may be configured to bend any suitable angle 232 to move the at least one turbine blade 208 at least partially out of the central bore 212.

As illustrated, in the retracted position, the at least one turbine blade 208 may move sufficiently out of the central bore 212 such that the secondary downhole tool 230 may pass by the at least one turbine blade 208. Indeed, in the retracted position, the at least one turbine blade 208 may bend such that the distal blade end 224 of the at least one turbine blade 208, as well as any other portions of the at least one turbine blade 208, move from the central bore 212 and into the generator recess 202. With the at least one turbine blade 208 retracted entirely from the central bore 212, the secondary downhole tool 230 may move free along the downhole tubular 200 past the downhole power generation system 134. Alternatively, only a portion of the at least one turbine blade 208 may move into the generator recess 202 as the secondary downhole tool 230 passes by the downhole power generation system 134. For example, the secondary downhole tool 230 may include a setting ball 320 of a downhole setting tool 322. Although the at least one turbine blade 208 may impede the setting ball 320 in the power generating position, a diameter of the setting ball 320 may be smaller than the diameter of the central bore 212. As such, the setting ball 320 may pass by the downhole power generation system 134 with the at least one turbine blade 208 only partially bending toward the retracted position.

Moreover, the downhole tubular 200 may further include at least one blade recess 324 formed in the radially inner surface 218 of the downhole tubular 200 in a position adjacent the opening 214. As illustrated, the opening 214 may be too small for the at least one turbine blade 208 to bend into the generator recess 202. That is, the distal blade end 224 of the at least one turbine blade 208 may contact the radially inner surface 218 as the at least one turbine blade 208 bends in response to contact with the secondary downhole tool 230. Such contact may restrain the at least one turbine blade 208 from further bending. Accordingly, the at least one blade recess 324 may formed in the radially inner surface 218 of the downhole tubular 200 in a position adjacent to the opening 214 such that the at least one blade recess 324 may receive the at least one turbine blade 208 as the at least one turbine blade 208 bends toward the retracted position. With the at least one turbine blade 208 received in the at least one blade recess 324, the central bore 212 may be clear such that the secondary downhole tool 230 may pass by the downhole power generation system 134.

Figure 4:
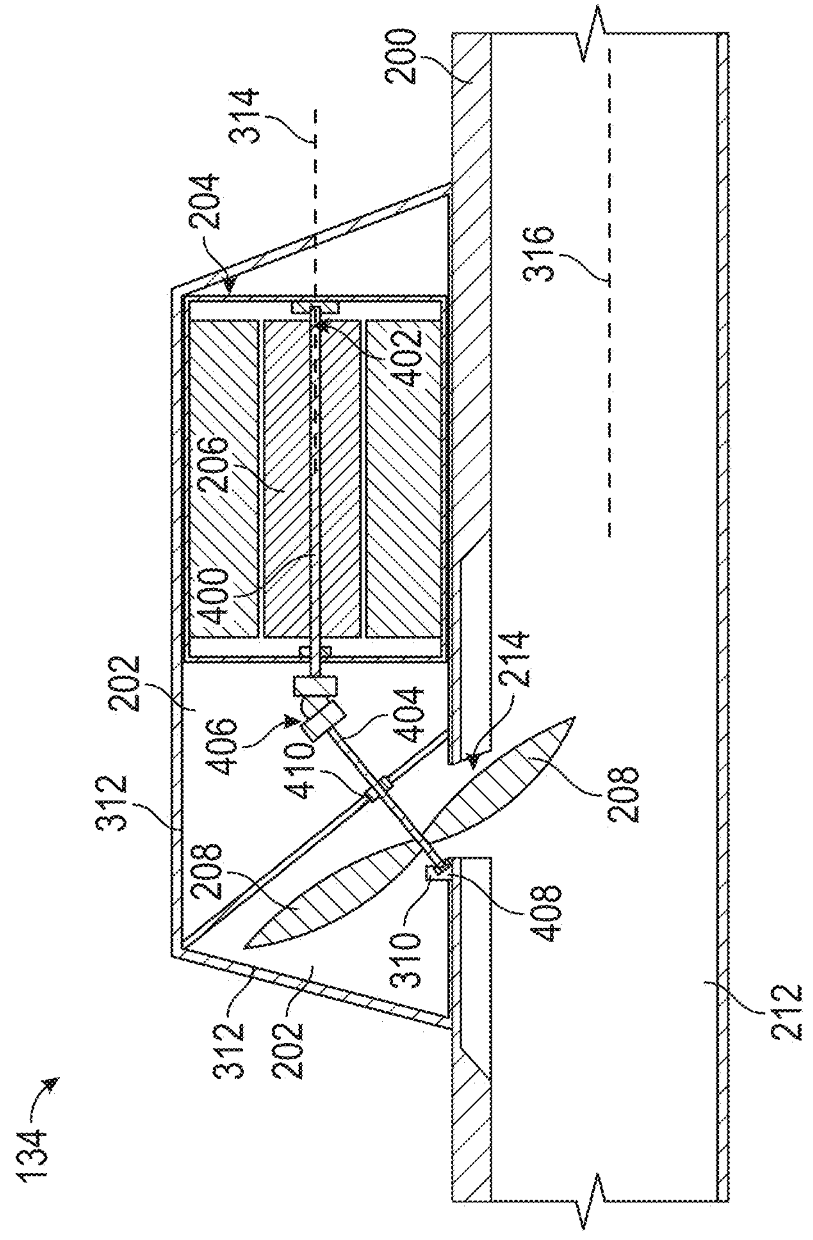
FIG. 4 illustrates a cross-sectional view of the downhole power generation system having a flexible coupler, in accordance with some embodiments of the present disclosure.

FIG. 4 illustrates a cross-sectional view of the downhole power generation system having a flexible coupler, in accordance with some embodiments of the present disclosure. As illustrated, the generator 204 may be disposed within the generator recess 202 in an orientation parallel to the central bore 212 such that the central generator axis 314 of the generator 204 is parallel with the central tubular axis 316 of the downhole tubular 200. Having the generator 204 oriented parallel to the central bore 212 may allow for a larger generator 204 to fit within the generator recess 202. That is, the generator 204 may have a larger diameter and/or axial length, which may increase the amount of power generated by the downhole power generation system 134.

As illustrated, the downhole power generation system 134 may include a main shaft 400 secured to the rotor 206. Indeed, a first end 402 of the main shaft 400 may extend into the generator 204, and the rotor 206 may be secured to the first end 402 of the main shaft 400 such that rotation of the main shaft 400 drives rotation of the rotor 206. The downhole power generation system 134 may further include a secondary shaft 404 that is coupled to the main shaft 400 via a flexible coupler 406. The flexible coupler 406 may be configured to transfer rotational movement such that rotation of the secondary shaft 404 may drive rotation of the main shaft 400. Further, the flexible coupler 406 may be configured to provide a hinged or rotatable interface between the secondary shaft 404 and the main shaft 400. As such, the secondary shaft 404 may be configured to hinge with respect to the main shaft 400 via the flexible coupler 406.

As set forth above, the generator 204 may be oriented parallel to the central bore 212. As such, the main shaft 400 may similarly extend axially outward from the generator 204 such that the main shaft 400 is parallel to the central tubular axis of the downhole tubular 200. However, as illustrated, the secondary shaft 404 may be angled with respect to the main shaft 400, via the flexible coupler 406, such that the secondary shaft 404 may extend to the at least one support bearing 310 (e.g., a first support bearing 408 and a second support bearing 410) mounted proximate the opening 214. The at least one support bearing 310 may be configured to restrain lateral and/or axial movement of the secondary shaft 404. Further, the secondary shaft 404 may be angularly offset from main shaft 400 by an angle between five degrees and forty-five degrees. Moreover, the at least one turbine blade 208 may be secured to the secondary shaft 404 between the first support bearing 408 and the second support bearing 410. However, the at least one turbine blade 208 may be secured to any portion of the secondary shaft 404 between the flexible coupler 406 and the first support bearing 408.

For similar reasons set forth above, having the at least one turbine blade 208 secured to the portion of the secondary shaft 404 disposed proximate the opening 214 may extend the at least one turbine blade 208 further into the central bore 212 than an axially oriented secondary shaft that is radially centered in the generator recess 202. Additionally, having the secondary shaft 404 oriented at an angle may permit the at least one turbine blade 208 to have a longer length than an axially oriented secondary shaft, which may increase the effectiveness of the at least one turbine blade 208. That is, having the secondary shaft 404 oriented at an angle may increase a distance between the interior surface 312 of the generator recess 202 and the secondary shaft 404 with respect to an axially oriented secondary shaft such the at least one turbine blade 208 may have a longer length without contacting the interior surface 312 of the generator recess 202.

Figure 5B:
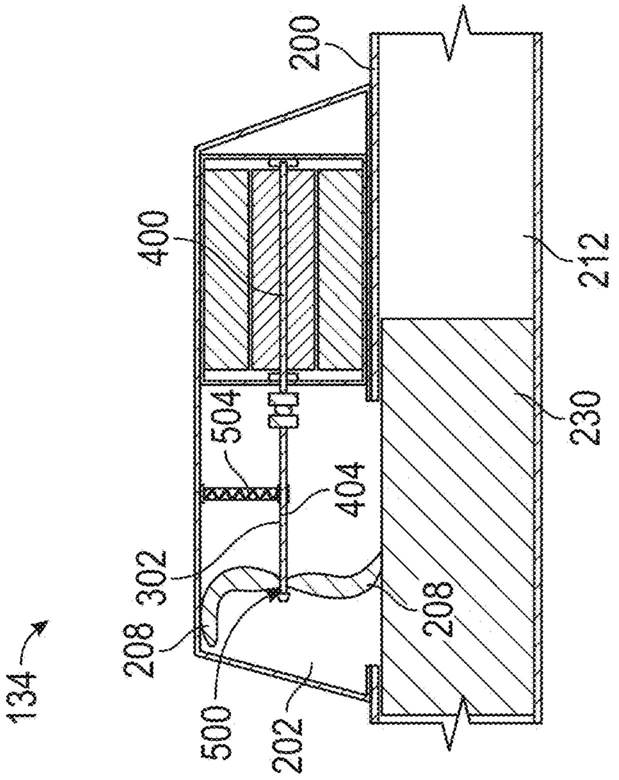
FIGS. 5A-B illustrate respective cross-sectional views of a downhole power generation system having flexible axial—the flow turbine blades secured to a spring biased shaft, in accordance with some embodiments of the present disclosure.
Figure 5A:
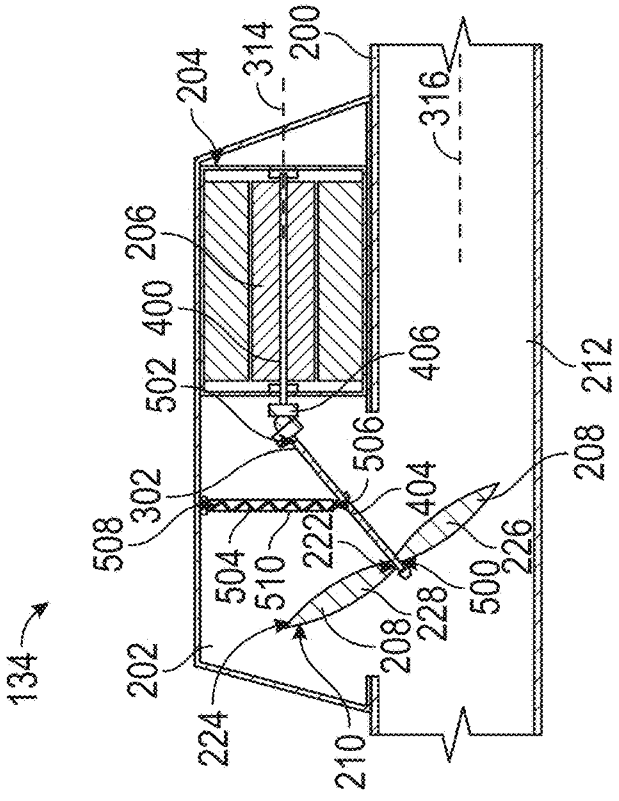

FIGS. 5A-B illustrate respective cross-sectional views of a downhole power generation system having flexible axial—the flow turbine blades secured to a spring biased shaft, in accordance with some embodiments of the present disclosure. In particular, FIG. 5A illustrates the downhole power generation system 134 having the at least one turbine blade 208 secured to the shaft 302 (e.g., spring biased shaft) and disposed in the power generating position. As set forth above, the generator 204 may be disposed within the generator recess 202 in an orientation parallel to the central bore 212 such that the central generator axis 314 of the generator 204 is parallel with the central tubular axis 316 of the downhole tubular 200. Further, the downhole power generation system 134 may include the main shaft 400 secured to the rotor 206, the secondary shaft 404 secured to the main shaft 400 via the flexible coupler 406, and the at least one turbine blade 208 secured to a distal portion 500 of the secondary shaft 404. Additionally, the flexible coupler 406 may be configured to transfer rotational movement such that rotation of the secondary shaft 404 may drive rotation of the main shaft 400, and the flexible coupler 406 may be configured to provide a hinged or rotatable interface between the secondary shaft 404 and the main shaft 400. As such, the secondary shaft 404 may be configured to hinge with respect to the main shaft 400 via the flexible coupler 406.

Further, the secondary shaft 404 may be cantilevered from the flexible coupler 406. That is, a proximal portion 502 of the secondary shaft 404 may be coupled to the flexible coupler 406, but the distal portion 500 of the secondary shaft 404 may be free (e.g., not affixed). As such, the secondary shaft 404 may be configured to rotate or hinge about the flexible coupler 406 during operation. For example, as illustrated, the secondary shaft 404 may be configured to hinge about the flexible coupler 406 to move the distal portion 500 of the secondary shaft 404 into the central bore 212 in the power generating position such that the secondary shaft 404 may move the at least one turbine blade 208 further into the central bore 212 or move the at least one turbine blade 208 entirely into the central bore 212 in the power generating position. Further, as set forth above, the at least one turbine blade 208 may include a plurality of turbine blades 210. Having the distal portion 500 of the secondary shaft 404 disposed in the central bore 212 may move at least some or all of the turbine blades of the plurality of turbine blades 210 at least partially into the central bore 212, which may increase efficiency of the downhole power generation system 134. For example, the first blade 226 of the plurality of turbine blades 210 may be disposed entirely within the central bore 212, and another turbine blade of the plurality of turbine blades 210 (e.g., the second blade 228), which may be angularly offset from the first blade 226 by one-hundred and eighty degrees, may have the proximal blade end 222 disposed in the central bore 212 and a distal blade end 224 disposed within the generator recess 202.

Moreover, the downhole power generation system 134 may further include a biasing spring 504 configured to bias the secondary shaft 404 toward the central bore 212 into the power generating position (e.g., the extended position). As illustrated, the biasing spring 504 may include a compression spring. However, the biasing spring 504 may include any suitable spring configured to bias the secondary shaft 404 toward the central bore 212. Further, a first end 506 of the biasing spring 504 may be secured to the secondary shaft 404 and a second end 508 of the biasing spring 504 may be secured to the interior surface 312 of the generator recess 202. Further, the biasing spring 504 may be disposed within a spring housing 510 configured to restrain lateral movement of the biasing spring 504. The spring housing 510 may be configured to telescope or otherwise collapse in response to compression of the biasing spring 504 to avoid hindering radial movement of the secondary shaft 404.

FIG. 5B illustrates the downhole power generating system 134 having the at least one turbine blade 208 secured to the shaft 302 (e.g., spring biased shaft) and disposed in the retracted position. As set forth above, the secondary downhole tool 230 (e.g., ball of setting tool, logging tool, wash pipe, etc.) may pass through the central bore 212 of the downhole tubular 200. In the power generating position, the secondary shaft 404 and/or the at least one turbine blade 208 may impede movement of the secondary downhole tool 230 through the central bore 212. However, as illustrated, the biasing spring 504 may be configured to compress in response to the at least one turbine blade 208 contacting the secondary downhole tool 230, which may move the distal portion 500 of the secondary shaft 404 from the power generating position in the central bore 212 toward the retracted position in the generator recess 202. In the retracted position the secondary shaft 404 may move into the generator recess 202 to an orientation that is axially aligned with the main shaft 400. However, the retracted position may include any suitable orientation of the secondary shaft 404 to permit the at least one turbine blade 208 to fully retract into the generator recess 202.

Further, as illustrated, the at least one turbine blade 208 may include a flexible material configured to elastically deform (e.g., bend) in response to contact with the secondary downhole tool 230 to bend the at least one turbine blade 208 from the power generating position (e.g., extended position) toward the retracted position. Moreover, the secondary shaft 404 may alternatively or additionally include flexible material. That is, the secondary shaft 404 may include flexible material such that the secondary shaft 404 may bend in response to contact of the at least one turbine blade 208 with the secondary downhole tool 230.

Figure 6B:
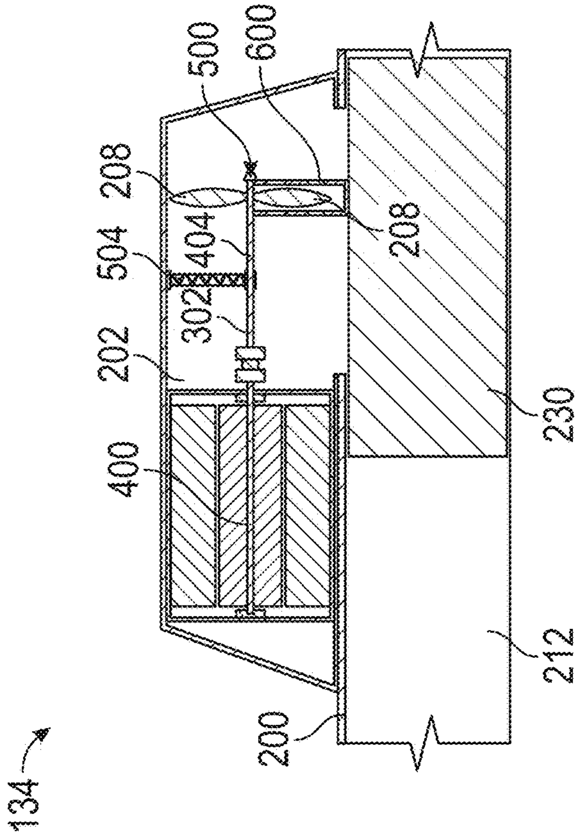
FIGS. 6A-B illustrate respective cross-sectional views of a downhole power generation system having rigid axial— the flow turbine blades secured to a spring biased shaft, in accordance with some embodiments of the present disclosure.
Figure 6A:
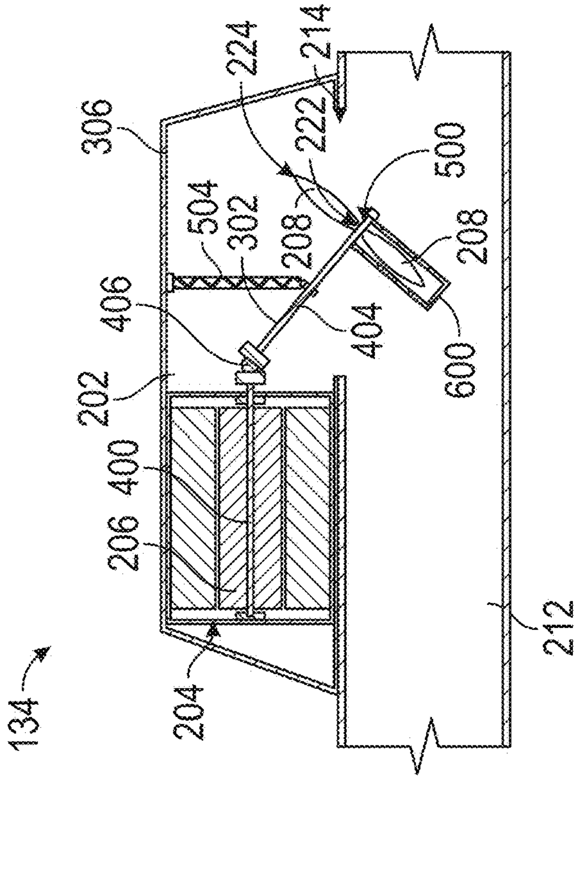

FIGS. 6A-B illustrate respective cross-sectional views of a downhole power generation system having rigid axial—the flow turbine blades secured to a spring biased shaft, in accordance with some embodiments of the present disclosure. In particular, FIG. 6A illustrates the downhole power generation system 134 having at least one rigid turbine blade 208 secured to the shaft 302 (e.g., the spring biased shaft) and disposed in the power generating position. As set forth above, the generator 204 may be disposed within the generator recess 202 in an orientation parallel to the central bore 212. The downhole power generation system 134 may include the main shaft 400 secured to the rotor 206, the secondary shaft 404 secured to the main shaft 400 via the flexible coupler 406, and the at least one turbine blade 208 secured to the distal portion 500 of the secondary shaft 404. Further, the secondary shaft 404 may be configured to hinge about the flexible coupler 406 to move the distal portion 500 of the secondary shaft 404 into the central bore 212 in the power generating position such that the secondary shaft 404 may move the at least one turbine blade 208 further into the central bore 212 or move the at least one turbine blade 208 entirely into the central bore 212 in the power generating position. Additionally, the biasing spring 504 may be configured to bias the secondary shaft 404 toward the central bore 212 into the power generating position (e.g., the extended position).

Moreover, the at least one turbine blade 208 may be stiff. That is, the at least one turbine blade may include a stiff material (e.g., metal, ceramic, cobalt, tungsten carbide, etc.) that is configured to not bend or only minimally bend in response to contact with the secondary downhole tool 230 (shown in FIG. 6B). The stiff material may include any material having an elastic modulus greater than two hundred Gigapascals (GPa). As such, the at least one turbine blade 208 may not be configured to bend from the power generating position to the retracted position in response to contact with the secondary downhole tool 230. Instead, the at least one turbine blade 208 may be configured to move from the power generating position to the retracted position via the biasing spring 504 compressing to move the secondary shaft 404 and the at least one turbine blade 208 into the generator recess 202. In the retracted position, the secondary shaft 404 may have an orientation that is axially aligned with the main shaft 400. Accordingly, a length of the at least one turbine blade 208 (e.g., length from the distal blade end 224 to the proximal blade end 222) may be based at least in part on a first distance between the opening 214 and the axially aligned secondary shaft 404, as well as a second distance between the axially aligned secondary shaft 404 and the radially outer interior surface 306 of the generator recess 202, which is disposed radially outward from the secondary shaft 404. That is, the length of the at least one turbine blade 208 may be shorter than both the first distance and the second distance such that the at least one turbine blade 208 may be entirely disposed within the generator recess 202 in the retracted position.

Further, as the at least one turbine blade 208 may be stiff, contact between the secondary downhole tool 230 and the at least one turbine blade 208 may damage the at least one turbine blade 208. As such, the downhole power generation system 134 may include a blade shield 600 secured to the secondary shaft 404 and disposed about the at least one turbine blade 208. Indeed, the blade shield 600 may be configured to interface with the secondary downhole tool 230 instead of the at least one turbine blade 208 to protect the at least one turbine blade 208 from damage. The blade shield 600 may include a perforated or otherwise open form such that the fluid flow may pass through the blade shield 600 to the at least one turbine blade 208 in the power generating position.

FIG. 6B illustrates the downhole power generation system 134 having the at least one rigid turbine blade 208 secured to the shaft 302 (e.g., the spring biased shaft) and disposed in the retracted position. As set forth above, the at least one rigid turbine blade 208 may not be configured to bend from the power generating position to the retracted position in response to contact with the secondary downhole tool 230. Instead, as illustrated, the at least one turbine blade 230 may be configured to move from the power generating position to the retracted position via the biasing spring 504 compressing to move the secondary shaft 404 and the at least one turbine blade 208 into the generator recess 202.

As illustrated, the secondary downhole tool 230 (e.g., ball of setting tool, logging tool, wash pipe, etc.) may pass through the central bore 212 of the downhole tubular 200. In the power generating position, the secondary shaft 404 and/or the at least one turbine blade 208 may impede movement of the secondary downhole tool 230 through the central bore 212. However, as illustrated, the biasing spring 504 may be configured to compress in response to the blade shield 600 contacting the secondary downhole tool 230. Alternatively, the biasing spring 504 may be configured to compress in response to the at least one turbine blade 208 contacting the secondary downhole tool 230. Moreover, compressing the biasing spring 504 may move the distal portion 500 of the secondary shaft 404 from the power generating position in the central bore 212 toward the retracted position in the generator recess 202. In the retracted position, the secondary shaft 404 may have an orientation that is axially aligned with the main shaft 400. However, the retracted position may include any suitable orientation of the secondary shaft 404 to permit the at least one turbine blade 208 to fully retract into the generator recess 202.

FIGS. 7A-B illustrate respective cross-sectional views of a downhole power generation system having hinged turbine blades, in accordance with some embodiments of the present disclosure. In particular, FIG. 7A illustrates the downhole power generation system 134 having at least one hinged turbine blade 208 disposed in the power generating position. As set forth above, the downhole power generation system 134 includes the generator recess 202 connected to the central bore 212 via an opening 214, as well as a generator 204 disposed at least partially within the generator recess 202. Further, the at least one hinged turbine blade 208 may be secured to the generator 204 and extend into the central bore 212 of the downhole tubular 200 in the power generating position (e.g., extended position). Moreover, as illustrated, the at least one hinged turbine blade 208 may be secured to the generator 204 via at least one hinge 700. That is, a first portion 702 of the at least one hinge 700 may be secured to the generator 204 and a second portion 704 of the at least one hinge 700 may be secured to the proximal end of the at least one turbine blade. As such, the at least one turbine blade 208 may be configured to rotate with respect to the generator 204 about the at least one hinge 700.

Further, the at least one hinge 700 may include a biasing mechanism 706 configured to bias the second portion 704 with respect to the first portion 702 such that the at least one turbine blade 208 is biased to rotate toward the power generating position (e.g., the extended position). In the power generating position, the fluid flow passing through the central bore 212 may exert a force on the at least one turbine blade 208, which may drive rotation of the rotor 206. The biasing mechanism 706 of the at least one hinge 700 may be configured to maintain the at least one turbine blade 208 in the power generating position in response to the force exerted on the at least one turbine blade 208 from the fluid flow in the central bore 212.

FIG. 7B illustrates the downhole power generation system 134 having at least one hinged turbine blade 208 disposed in the retracted position. As set forth above, the at least one hinge 700 may include the biasing mechanism 706 configured to bias the at least one turbine blade 208 to rotate toward the power generating position (e.g., the extended position). However, as set forth above, the secondary downhole tool 230 (e.g., ball of setting tool, logging tool, wash pipe, etc.) may pass through the central bore 212 of the downhole tubular 200. The at least one turbine blade 208 may be configured to rotate about the at least one hinge 700 in response to contact with the secondary downhole tool 230 to move the at least one turbine blade 208 toward the retracted position. In the retracted position, the at least one turbine blade 208 may be rotated about the at least one hinge 700 to collapse the at least one turbine blade 208 (e.g., the first blade 226) against the generator 204 and/or an adjacent turbine blade (e.g., the second blade 228). Further, in the retracted position, the at least one turbine blade 208 may be disposed within the generator recess 202 such that the secondary downhole tool 230 may move freely along the downhole tubular 200 past the downhole power generation system 134.

FIGS. 8A-B illustrate respective cross-sectional views of a downhole power generation system having a spring-biased generator, in accordance with some embodiments of the present disclosure. In particular, FIG. 8A illustrates the downhole power generation system 134 having the spring-biased generator 204 disposed in the power generating position. As set forth above, the downhole power generation system 134 includes the generator recess 202 connected to the central bore 212 via the opening 214, as well as the generator 204 disposed at least partially within the generator recess 202. The generator 204 may include the rotor 206 and the stator 300 (shown above). The rotor 206 and the stator 300 of the generator 204 may be configured to move between the power generating position (e.g., the extended position) and the retracted position. As illustrated, in the power generating position, at least a portion of the generator 204 may be disposed within the central bore 212 of the downhole tubular 200.

The downhole power generation system 134 may include a generator biasing mechanism 800 configured to bias the generator 204 (e.g., the rotor 206 and/or the stator 300) toward the power generating position. The generator biasing mechanism 800 may include a spring, piston, and/or any other suitable mechanism for biasing the generator 204 toward the power generating position. For example, as illustrated, the generator biasing mechanism 800 may include a compression spring 802 having a first end secured to the generator 204 and a second end secured to the interior surface 312 of the generator recess 202 such that the compression spring 802 may bias the generator 204 toward the power generating position. Additionally, the generator 204 may be secured to a track 804 configured to limit non-radial movement of the generator 204. The track 804 may extend between the power generating position and the retracted position such that the track 804 may guide radial movement of the generator 204.

Moreover, the at least one turbine blade 208 may be secured to the generator 204. As such, having at least a portion of the generator 204 disposed within the central bore 212 in the power generating position may move the at least one turbine blade 208 to be entirely disposed within the central bore 212, which may increase the efficiency of the downhole power generation system 134.

FIG. 8B illustrates the downhole power generation system 134 having the spring-biased generator 204 disposed in the retracted position. As set forth above, the secondary downhole tool 230 (e.g., ball of setting tool, logging tool, wash pipe, etc.) may pass through the central bore 212 of the downhole tubular 200. In response to contact between the at least one turbine blade 208 and secondary downhole tool 230, the generator biasing mechanism 800 may be configured to compress, which may move the generator 204 from the power generating position disposed at least partially within the central bore 212 to the retracted position. In the retracted position, the generator 204 may be entirely disposed within the generator recess 202. Further, in the retracted position, the generator 204 may be disposed in the generator recess 202 such that the at least one turbine blade 208 secured to the generator 204 may also be at least partially disposed within the generator recess 202. Further, the at least one turbine blade 208 may include the flexible material set forth above such that the at least one turbine blade 208 may additionally bend in response to contact with the secondary downhole tool 230 to move from the power generating position toward the retracted position.

Accordingly, the present disclosure may provide a downhole power generation system configured to move between a power generating position (e.g., extended position) and a retracted position to permit other downhole tools to pass by the downhole power generation system while the downhole power generation system is deployed downhole. The systems may include any of the various features disclosed herein, including one or more of the following statements.

Statement 1. A downhole power generation system, comprising: a downhole tubular having a generator recess, wherein the generator recess is radially offset from a central bore of the downhole tubular, and wherein the generator recess is connected to the central bore via an opening; a generator disposed at least partially within the generator recess, wherein the generator includes a rotor and a stator; and at least one turbine blade configured to drive rotation of the rotor in response to fluid flow through the central bore with the at least one turbine blade in an extended position, wherein at least one turbine blade is disposed at least partially within the central bore in the extended position, and wherein the at least one turbine blade is configured to move at least partially into the generator recess toward a retracted position in response to contact with a downhole tool moving along the central bore.

Statement 2. The system of statement 1, wherein the at least one turbine blade comprises a flexible material, and wherein the at least one turbine blade is configured to bend in response to contact with the downhole tool to move toward the retracted position.

Statement 3. The system of statement 1 or statement 2, wherein the at least one turbine blade is configured to bend at an angle between fifteen degrees and one-hundred and twenty degrees in response to contact with the downhole tool.

Statement 4. The system of any preceding statement, wherein at least one turbine blade is configured to bend via elastic deformation of the at least one turbine blade.

Statement 5. The system of any preceding statement, wherein the at least one turbine blade comprises a flexible material having an elastic modulus between one Kilopascal (KPa) and two hundred Gigapascals (GPa).

Statement 6. The system of any preceding statement, further comprising at least one hinge, wherein the at least one turbine blade is configured to rotate about the at least one hinge in response to contact with the downhole tool to move toward the retracted position.

Statement 7. The system of any preceding statement, wherein the at least one turbine blade is secured to the rotor, wherein the rotor is disposed at least partially within the central bore in the extended position, and wherein the rotor is configured to retract into the generator recess to move the at least one turbine blade toward the retracted position in response to contact of the at least one turbine blade with the downhole tool.

Statement 8. The system of any preceding statement, wherein the at least one blade comprises at least one cross-flow blade.

Statement 9. The system of any of statements 1-7, wherein the at least one blade comprises at least one axial flow blade.

Statement 10. The system of any preceding statement, wherein the generator comprises a synchronous generator, an asynchronous generator, an axial flux generator, a radial flux generator, or some combination thereof.

Statement 11. The system of any preceding statement, wherein the generator comprises an axial flux asynchronous induction generator.

Statement 12. The system of any preceding statement, further comprising a shaft, wherein a first end of the shaft is coupled to the rotor, wherein the at least one turbine blade is secured to a second end of the shaft, and wherein fluid flow through the central bore with the at least one turbine blade in an extended position is configured to rotate the shaft to drive rotation of the rotor.

Statement 13. The system of any preceding statement, wherein the generator is disposed within the generator recess at angle such that a central generator axis of the generator is angularly offset from a central tubular axis of the downhole tubular by an angle between five degrees and forty-five degrees.

Statement 14. The system of any preceding statement, wherein the at least one turbine blade is disposed entirely within the generator recess in the retracted position.

Statement 15. The system of any preceding statement, further comprising at least one blade recess formed in an inner surface of a sidewall of the downhole tubular in a position adjacent to the opening, wherein the at least one blade recess is configured to receive the at least one blade in the retracted position.

Statement 16. A downhole power generation system, comprising: a downhole tubular having a generator recess, wherein the generator recess is radially offset from a central bore of the downhole tubular, and wherein the generator recess is connected to the central bore via an opening; a generator disposed within the generator recess, wherein the generator includes a rotor and a stator; a main shaft secured to the rotor; a secondary shaft coupled to the main shaft; a flexible coupler configured to couple the secondary shaft to the main shaft, and wherein the secondary shaft is configured to hinge with respect to the main shaft via the flexible coupler; and at least one turbine blade secured to the secondary shaft and configured to rotate the secondary shaft to drive rotation of the main shaft and the rotor in response to fluid flow through the central bore with the at least one turbine blade in an extended position, wherein at least one turbine blade is disposed at least partially within the central bore in the extended position, and wherein the at least one turbine blade is configured to move at least partially into the generator recess toward a retracted position in response to contact with a downhole tool moving along the central bore.

Statement 17. The system of statement 16, further comprising a biasing spring having a first end secured to the secondary shaft and a second end secured to an interior surface of the generator recess, wherein the biasing spring is configured to bias the secondary shaft toward the central bore in the extended position and compress to permit the secondary shaft to move into the generator recess in the retracted position.

Statement 18. The system of statement 16 or statement 17, wherein the at least one blade and/or the secondary shaft comprise a flexible material, and wherein the at least one turbine blade and/or the secondary shaft is configured to bend in response to contact of the at least one turbine blade with the downhole tool to move the at least one turbine blade toward the retracted position.

Statement 19. The system of statement 16 or statement 17, further comprising a blade shield secured to the main shaft and disposed about the at least one turbine blade, wherein the at least one turbine blade is configured to move at least partially into the generator recess toward a retracted position in response to the blade shield contacting the downhole tool moving along the central bore.

Statement 20. A downhole power generation system, comprising: a downhole tubular having a generator recess, wherein the generator recess is radially offset from a central bore of the downhole tubular, and wherein the generator recess is connected to the central bore via an opening; a generator disposed at least partially within the generator recess, wherein the generator includes a rotor and a stator, wherein the rotor and stator are configured to move between an extended position and a retracted position, wherein the rotor is disposed at least partially within the central bore in the extended position, and wherein the rotor is disposed entirely in the generator recess in the retracted position; a biasing mechanism configured to bias the rotor and the stator toward the extended position; and at least one cross-flow turbine blade configured to drive rotation of the rotor in response to fluid flow through the central bore with the rotor and the stator in the extended position, wherein at least one turbine blade is disposed at least partially within the central bore with the rotor and the stator in the extended position, and wherein the rotor and the stator are configured to move from the extended position toward the retracted position in response to contact between the at least one turbine blade and a downhole tool moving along the central bore.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, as the present embodiments may be modified and practiced in different but equivalent manners apparent to those skilled in the art having the benefit of the teachings herein. Although individual embodiments are discussed, all combinations of each embodiment are contemplated and covered by the disclosure. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure.

What is claimed is:

1. A downhole power generation system, comprising:

a downhole tubular having a generator recess, wherein the generator recess is radially offset from a central bore of the downhole tubular, and wherein the generator recess is connected to the central bore via an opening;

a generator disposed at least partially within the generator recess, wherein the generator includes a rotor and a stator; and at least one turbine blade configured to drive rotation of the rotor in response to fluid flow through the central bore with the at least one turbine blade in an extended position, wherein at least one turbine blade is disposed at least partially within the central bore in the extended position, wherein the at least one turbine blade is configured to move at least partially into the generator recess toward a retracted position in response to contact with a downhole tool moving along the central bore, and wherein the at least one turbine blade comprises a flexible material, and wherein the at least one turbine blade is configured to bend in response to contact with the downhole tool to move toward the retracted position.

2. The system of claim 1, wherein the at least one turbine blade is configured to bend at an angle between fifteen degrees and one-hundred and twenty degrees in response to contact with the downhole tool.

3. The system of claim 1, wherein at least one turbine blade is configured to bend via elastic deformation of the at least one turbine blade.

4. The system of claim 1, wherein the flexible material has an elastic modulus between one Kilopascal (KPa) and two hundred Gigapascals (GPa).

5. The system of claim 1, further comprising at least one hinge, wherein the at least one turbine blade is configured to rotate about the at least one hinge in response to contact with the downhole tool to move toward the retracted position.

6. The system of claim 1, wherein the at least one turbine blade is secured to the rotor, wherein the rotor is disposed at least partially within the central bore in the extended position, and wherein the rotor is configured to retract into the generator recess to move the at least one turbine blade toward the retracted position in response to contact of the at least one turbine blade with the downhole tool.

7. The system of claim 1, wherein the at least one blade comprises at least one cross-flow blade.

8. The system of claim 1, wherein the at least one blade comprises at least one axial flow blade.

9. The system of claim 1, wherein the generator comprises a synchronous generator, an asynchronous generator, an axial flux generator, a radial flux generator, or some combination thereof.

10. The system of claim 1, wherein the generator comprises an axial flux asynchronous induction generator.

11. The system of claim 1, further comprising a shaft, wherein a first end of the shaft is coupled to the rotor, wherein the at least one turbine blade is secured to a second end of the shaft, and wherein fluid flow through the central bore with the at least one turbine blade in an extended position is configured to rotate the shaft to drive rotation of the rotor.

12. The system of claim 1, wherein the generator is disposed within the generator recess at angle such that a central generator axis of the generator is angularly offset from a central tubular axis of the downhole tubular by an angle between five degrees and forty-five degrees.

13. The system of claim 1, wherein the at least one turbine blade is disposed entirely within the generator recess in the retracted position.

14. The system of claim 1, further comprising at least one blade recess formed in an inner surface of a sidewall of the downhole tubular in a position adjacent to the opening, wherein the at least one blade recess is configured to receive the at least one blade in the retracted position.

15. A downhole power generation system, comprising:

a downhole tubular having a generator recess, wherein the generator recess is radially offset from a central bore of the downhole tubular, and wherein the generator recess is connected to the central bore via an opening;

a generator disposed within the generator recess, wherein the generator includes a rotor and a stator;

a main shaft secured to the rotor;

a secondary shaft coupled to the main shaft;

a flexible coupler configured to couple the secondary shaft to the main shaft, and wherein the secondary shaft is configured to hinge with respect to the main shaft via the flexible coupler;

at least one turbine blade secured to the secondary shaft and configured to rotate the secondary shaft to drive rotation of the main shaft and the rotor in response to fluid flow through the central bore with the at least one turbine blade in an extended position, wherein at least one turbine blade is disposed at least partially within the central bore in the extended position, and wherein the at least one turbine blade is configured to move at least partially into the generator recess toward a retracted position in response to contact with a downhole tool moving along the central bore; and a biasing spring having a first end secured to the secondary shaft and a second end secured to an interior surface of the generator recess, wherein the biasing spring is configured to bias the secondary shaft toward the central bore in the extended position and compress to permit the secondary shaft to move into the generator recess in the retracted position.

16. The system of claim 15, further comprising a blade shield secured to the main shaft and disposed about the at least one turbine blade, wherein the at least one turbine blade is configured to move at least partially into the generator recess toward the retracted position in response to the blade shield contacting the downhole tool moving along the central bore.

17. A downhole power generation system, comprising:

a downhole tubular having a generator recess, wherein the generator recess is radially offset from a central bore of the downhole tubular, and wherein the generator recess is connected to the central bore via an opening;

a generator disposed within the generator recess, wherein the generator includes a rotor and a stator;

a main shaft secured to the rotor;

a secondary shaft coupled to the main shaft;

a flexible coupler configured to couple the secondary shaft to the main shaft, and wherein the secondary shaft is configured to hinge with respect to the main shaft via the flexible coupler; and at least on turbine blade secured to the secondary shaft and configured to rotate the secondary shaft to drive rotation of the main shaft and the rotor in response to fluid flow through the central bore with the at least one turbine blade in an extended position, wherein at least one turbine blade is disposed at least partially within the central bore in the extended position, and wherein the at least one turbine blade is configured to move at least partially into the generator recess toward a retracted position in response to contact with a downhole tool moving along the central bore, and wherein the at least one turbine blade and/or the secondary shaft comprise a flexible material, and wherein the at least one turbine blade and/or the secondary shaft is configured to bend in response to contact of the at least one turbine blade with the downhole tool to move the at least one turbine blade toward the retracted position.

* * * * *